Patented July 2, 1929.

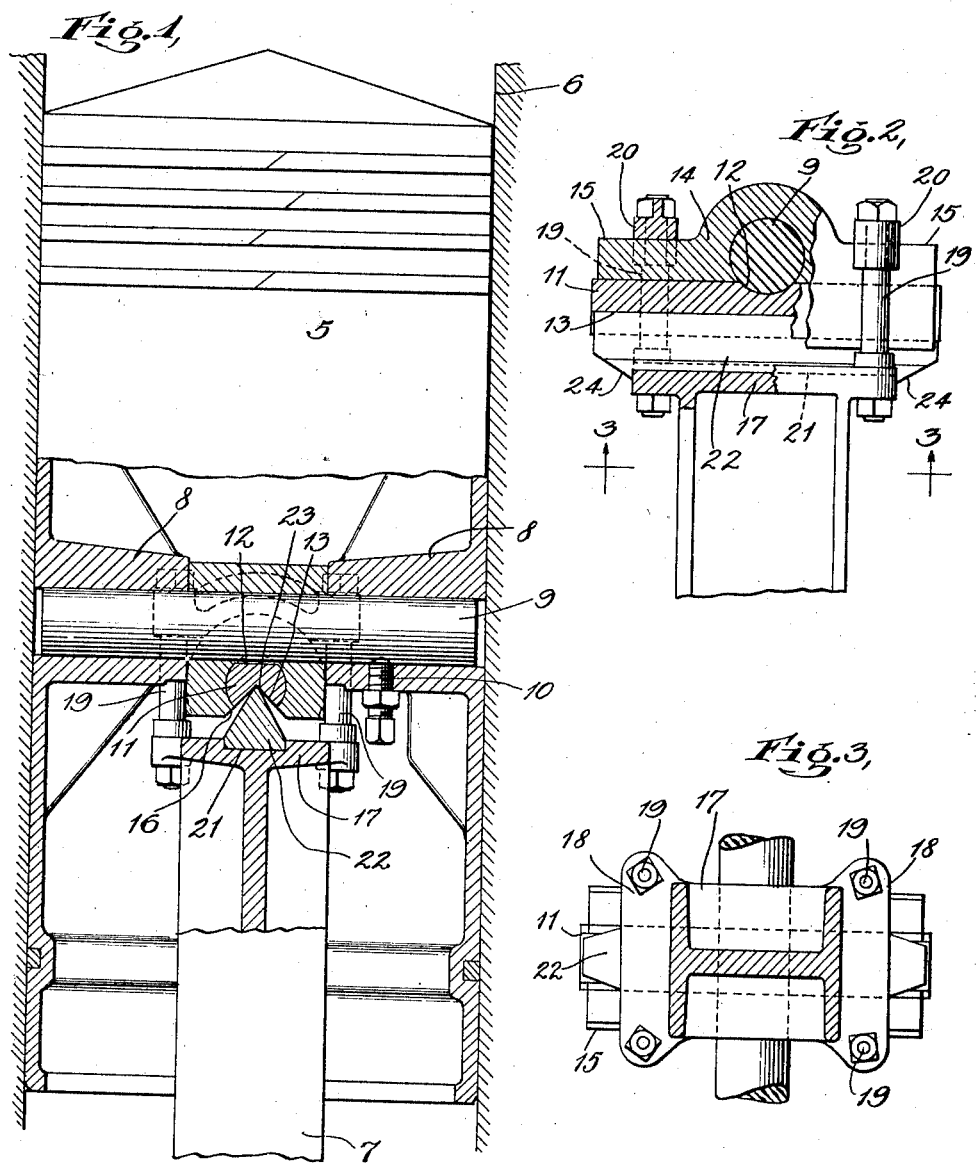

1,718,963

UNITED STATES PATENT OFFICE.

CARL H. KNUDSEN, OF BROOKLYN, NEW YORK.

WRIST-PIN CONSTRUCTION.

Application filed March 12, 1926, Serial No. 94,345. Renewed November 17, 1928.

This invention relates to wrist pin constructions or mechanism of this class for coupling the connecting rod and piston in internal combustion engines and like apparatus; and the object of the invention is to provide a wrist pin construction consisting of pin or shaft members disposed at right angles to each other and one above the other and with means cooperating with one of said shafts and mounted in connection with the connecting rod to provide a comparatively small bearing area or support for said connecting rod, said means being so constructed as to compensate for lateral rocking movement of the piston within predetermined limits; a further object being to provide a wrist pin construction, the angularly disposed pins of which are keyed together and the pin with which the connecting rod is mounted being positioned beneath the other pin and having at its lower face a V-shaped recess extending to the axis of the pin in which a bearing bar V-shaped in form in cross section is adapted to seat whereby the bearing friction between the connecting rod and piston is materially reduced; and with these and other objects in view, the invention consists in a wrist pin construction of the class and for the purpose specified which is simple in construction, efficient in use and which is constructed as hereinafter described and claimed.

The invention is fully disclosed in the following specification, of which the accompanying drawing forms a part, in which the separate parts of my improvement are designated by suitable reference characters in each of the views, and in which:

Fig. 1 is a side and sectional view of a piston and connecting rod showing my improved wrist pin construction.

Fig. 2 is a view at right angles to that shown in Fig. 1 but showing only a part of the construction; and, Fig. 3 is a partial section on the line 3—3 of Fig. 2.

In the drawing I have indicated at 5, the piston of an internal combustion engine, and at 6 I have represented the cylinder wall in which the piston 5 is mounted. At 7, I have shown a connecting rod coupled with the piston 5 by means of my improved wrist pin construction.

The piston 5 is provided on its inner faces with oppositely disposed bearings 8 in which a pin or shaft 9 is mounted and retained in position by a set screw 10. Mounted at right angles to the pin or shaft 9 is another pin or shaft 11 recessed centrally as shown at 12 to key the same to the shaft 9. The lower face of the pin 11 is provided with a V-shaped groove 13 extending longitudinally thereof and terminating at the axis of the pin 11 as clearly seen in Fig. 1 of the drawing. The pins 9 and 10 both pass through a bearing block 14, the central portion of which fits between the bearings 8 of the piston and arranged at right angles to the bearings 8 and in longitudinal alinement with the pin 11 are laterally directed extensions 15. The lower face of the block 14 and the extensions 15 thereof are cut away and grooved as shown at 16, see Fig. 1, to register in alinement with the V-shaped groove 13 in the pin 11.

The upper or piston end of the connecting rod 7 terminates in a flat crosshead 17 having laterally directed flange extensions 18 through which bolts 19 are passed in coupling the connecting rod with the wrist pin construction. These bolts also pass through arc-shaped strap members 20 which rest upon the top arc-shaped faces of the extensions 15 as seen in Fig. 2 of the drawing. Centrally of the crosshead 17 of the connecting rod 7 is an elongated groove 21 which extends in parallel relation to the pin 11 when the connecting rod is mounted in position. Placed in this groove is a bar 22 preferably composed of hard metal or metal treated to render the same strong and durable. The upper face of this bar is V-shaped in form in cross section to seat in the V-shaped recess 13 in the pin 11, and the cross sectional form of the V-shaped end of said bar is materially less than the corresponding form of the recess 13 to provide clearance at both sides of the bar to permit the connecting rod to swing on the fin-like bearing 23 at the peak and extending longitudinally of said bar in the operation of the crank, in driving the piston upwardly and downwardly in the cylinder in the usual manner, and also to permit of the proper alinement of the piston in the cylinder by virtue of the rocking movement provided as above; it being further understood that the piston 5 may also aline itself to the cylinder in a direction at right angles to the first named alinement by the rocking movement of the piston or the pin 9 thereof in the bearing block 14, thus providing a substantially universal wrist pin mounting for the piston and connecting rod.

With my improved wrist pin construction, it will be apparent that the rotation of the crank of the crank shaft in connection with which the connecting rod 7 is mounted, rotates in a direction in parallelism with the pin 9 and bearings 8 of the piston, whereby the thrust of the piston in the cylinder and upon the cylinder wall, by virtue of the crank shaft operation, is taken up by the strongest sides of the piston rather than the weak sides as is customary with the standard type of wrist pin construction and piston mounting thereon. By virtue of this construction and method of operation, it will be apparent that the proper coaction of the piston with the cylinder is maintained at all times during the cycle of operation and especially in the provision of a proper alinement of the piston, especially when inaccuracies occur in the construction or manufacture of an engine and particularly the cylinders thereof.

I also preferably extend the ends of the bar 22 to overlie the crosshead 17 of the connecting rod as shown at 24 to prevent accidental displacement of the bar. It will be understood that while I have shown my improved wrist pin construction as mounted in a piston of specific form, that my invention is not necessarily limited to the use of the wrist pin herein shown and described, and this means of coupling may be used wherever practical and suitable, for example in such apparatus as pumps, compressors and like apparatus; and various other changes in and modifications of the construction herein shown and described may be made within the scope of the appended claims without departing from the spirit of my invention or sacrificing its advantages.

Having fully described my invention, what I claim as new and desire to secure by Letters Patent, is:—

1. A wrist pin construction comprising a pin for mounting in the piston bearings, and means traversing said pin and coupled therewith for mounting a connecting rod in connection with said piston, said last named means including a bearing bar on the connecting rod, and engaging part of said means below said pin to permit lateral swinging movement of the rod in a direction in line with the axis of said pin.

2. A wrist pin construction comprising a pin for mounting in the piston bearings, and means traversing said pin and coupled therewith for mounting a connecting rod in connection with said piston, said last named means including a bearing bar on the connecting rod constructed to permit lateral swinging movement of the rod in a direction in line with the axis of said pin, and bolts and strap members for retaining the rod and bar in position.

3. A wrist pin construction comprising a bearing block adapted to be positioned between the piston bosses, wrist pin bearings and pin in said block and extending into said bearings and on which said bearing block is rotatable, the lower face of said block having a V-shaped groove and the connecting rod being provided with a member adapted to enter the groove of said block and of less cross sectional area than said groove to permit of rocking movement of the connecting rod with relation to said bearing block.

4. A wrist pin construction comprising a bearing block adapted to be positioned between the piston bosses, wrist pin bearings and pin in said block and extending into said bearings and on which said bearing block is rotatable, the lower face of said block having a V-shaped groove and the connecting rod being provided with a member adapted to enter the groove of said block and of less cross sectional area than said groove to permit of rocking movement of the connecting rod with relation to said bearing block, and means for retaining the connecting rod and said member in coupled relation with reference to said block.

5. A wrist pin construction comprising a bearing block adapted to be positioned between the piston bosses, wrist pin bearings and pin in said block and extending into said bearings and on which said bearing block is rotatable, the lower face of said block having a V-shaped groove and the connecting rod being provided with a member adapted to enter the groove of said block and of less cross sectional area than said groove to permit of rocking movement of the connecting rod with relation to said bearing block, and means for retaining the connecting rod and said member in coupled relation with reference to said block, said last named means comprising bolts and strap members.

6. A wrist pin construction comprising a bearing block adapted to be positioned between the piston bosses, wrist pin bearing and pin in said block and extending into said bearings and on which said bearing block is rotatable, the lower face of said block having a V-shaped groove and the connecting rod being provided with a member adapted to enter the groove of said block and of less cross sectional area than said groove to permit of rocking movement of the connecting rod with relation to said bearing block, means for retaining the connecting rod and said member in coupled relation with reference to said block, said last named means comprising bolts and strap members, and said bearing block having a pin therein arranged at right angles to the first named pin and with a groove coinciding with the groove of said block, said groove terminating at the axis of the last named pin and in connection with which the member on said connecting rod operates.

7. A wrist pin construction comprising a bearing block adapted to be positioned between the piston bosses, wrist pin bearings and pin in said block and extending into said bearings and on which said bearing block is rotatable, the lower face of said block having a V-shaped groove and the connecting rod being provided with a member adapted to enter the groove of said block and of less cross sectional area than said groove to permit of rocking movement of the connecting rod with relation to said bearing block, means for retaining the connecting rod and said member in coupled relation with reference to said block, said last named means comprising bolts and strap members, and said bearing block having a pin therein arranged at right angles to the first named pin and with a groove coinciding with the groove of said block, said groove terminating at the axis of the last named pin and in connection with which the member on said connecting rod operates, and said second named pin being positioned below the first named pin and keyed thereto.

8. A wrist pin construction comprising two pin members arranged at right angles to each other and one above the other, a bearing block for both of said pin members at the intersection thereof, the ends of one of said pin members extending and adapted to rest in the piston bearings, and the connecting rod being provided with a member formed independently from said rod and extending longitudinally of the other of said pins and engaging the same whereby the rod is capable of rocking movement in one direction, and the piston capable of rocking movement in a direction at right angles to the first named movement.

9. A wrist pin construction comprising two pin members arranged at right angles to each other and one above the other, a bearing block for both of said pin members at the intersection thereof, the ends of one of said pin members extending and adapted to rest in the piston bearings, the connecting rod being provided with a member cooperating with the other of said pins whereby the rod is capable of rocking movement in one direction and the piston capable of rocking movement in a direction at right angles to the first named movement, and means for coupling the connecting rod with said bearing block.

10. A wrist pin construction comprising two pin members arranged at right angles to each other and one above the other, a bearing block for both of said pin members at the intersection thereof, the ends of one of said pin members extending and adapted to rest in the piston bearings, the connecting rod being provided with a member cooperating with the other of said pins whereby the rod is capable of rocking movement in one direction and the piston capable of rocking movement in a direction at right angles to the first named movement, means for coupling the connecting rod with said bearing block and the second named pin having a groove terminating in the axis of the pin and opening outwardly therethrough and through said bearing block in connection with which the member on the connecting rod operates.

11. A wrist pin construction comprising two pin members arranged at right angles to each other and one above the other, a bearing block for both of said pin members at the intersection thereof, the ends of one of said pin members extending and adapted to rest in the piston bearings, the connecting rod being provided with a member cooperating with the other of said pins whereby the rod is capable of rocking movement in one direction and the piston capable of rocking movement in a direction at right angles to the first named movement, means for coupling the connecting rod with said bearing block and the second named pin having a groove terminating in the axis of the pin and opening outwardly therethrough and through said bearing block in connection with which the member on the connecting rod operates, said groove extending longitudinally of said pin and bearing block.

12. A wrist pin construction comprising two pin members arranged at right angles to each other and one above the other, a bearing block for both of said pin members at the intersection thereof, the ends of one of said pin members extending and adapted to rest in the piston bearings, the connecting rod being provided with a member cooperating with the other of said pins whereby the rod is capable of rocking movement in one direction and the piston capable of rocking movement in a direction at right angles to the first named movement, means for coupling the connecting rod with said bearing block and the second named pin having a groove terminating in the axis of the pin and opening outwardly therethrough and through said bearing block in connection with which the member on the connecting rod operates, said groove extending longitudinally of said pin and bearing block and being V-shaped in form in cross section, and said member being V-shaped in form but of less transverse dimensions than the corresponding dimensions of said groove.

13. A wrist pin construction to provide a substantially universal mounting of a piston in a cylinder and on the connecting rod of said piston, consisting of bearing members arranged at right angles to each other and one above the other, the piston being mounted on one of said bearing members and the connecting rod coupled with the other, and the last named bearing member consisting of two parts one of which is keyed to the first named bearing member and the other of which is movable laterally with respect to the former.

14. A wrist pin construction of the class described, comprising a bearing block, a pin in the upper end portion of said block with the ends of said pin projecting at the opposite sides thereof, said bearing block having laterally directed extensions, a pin mounted in said block and extending through said extensions and at right angles to the first named pin and keyed thereto.

15. A wrist pin construction of the class described comprising a bearing block, a pin in the upper end portion of said block with the ends of said pin projecting at the opposite sides thereof, said bearing block having laterally directed extensions, a pin mounted in said block and extending through said extensions and at right angles to the first named pin and keyed thereto, the lower face of the second named pin and said block being provided with a groove extending longitudinally thereof.

16. A wrist pin construction of the class described comprising a bearing block, a pin in the upper end portion of said block with the ends of said pin projecting at the opposite sides thereof, said bearing block having laterally directed extensions, a pin mounted in said block and extending through said extensions and at right angles to the first named pin and keyed thereto, the lower face of the second named pin and said block being provided with a groove extending longitudinally thereof, and a bar of less cross sectional form than said groove and the peak of which is adapted to bear on the pin at the base of the groove therein.

17. A wrist pin construction of the class described comprising a bearing block, a pin in the upper end portion of said block with the ends of said pin projecting at the opposite sides thereof, said bearing block having laterally directed extensions, a pin mounted in said block and extending through said extensions and at right angles to the first named pin and keyed thereto, the lower face of the second named pin and said block being provided with a groove extending longitudinally thereof, a bar of less cross sectional form than said groove and the peak of which is adapted to bear on the pin at the base of the groove therein, and means involving bolts secured to a connecting rod and strap members encircling the extensions of said bearing block for coupling a connecting rod with said wrist pin construction.

18. A wrist pin construction of the class described comprising a bearing block, a pin in the upper end portion of said block with the ends of said pin projecting at the opposite sides thereof, said bearing block having laterally directed extensions, a pin mounted in said block and extending through said extensions and at right angles to the first named pin and keyed thereto, the lower face of the second named pin and said block being provided with a groove extending longitudinally thereof, a bar of less cross sectional form than said groove and the peak of which is adapted to bear on the pin at the base of the groove therein, means involving bolts secured to a connecting rod and strap members encircling the extensions of said bearing block for coupling a connecting rod with said wrist pin construction, and said connecting rod having a grooved crosshead for receiving and supporting said bar.

19. In a wrist pin construction comprising bearing members arranged in crossed relation for mounting a connecting rod in connection with a piston with the bearing of said rod at right angles to the pin bearing, said connecting rod having a crosshead with which the bearing for said rod is coupled.

20. In a wrist pin construction comprising bearing members arranged in crossed relation for mounting a connecting rod in connection with a piston with the bearing of said rod at right angles to the pin bearing, said connecting rod having a crosshead with which the bearing for said rod is coupled, and means for mounting said connecting rod in connection with said wrist pin construction.

In testimony that I claim the foregoing as my invention I have signed my name this 23rd day of February, 1926.

CARL H. KNUDSEN.